United States Patent [19]

Brown

[11] Patent Number: 4,690,609
[45] Date of Patent: Sep. 1, 1987

[54] TRUCK LOADING APPARATUS

[76] Inventor: James M. Brown, 1637 Deer Valley Rd., Crown Point, Ind. 46307

[21] Appl. No.: 908,314

[22] Filed: Sep. 17, 1986

Related U.S. Application Data

[63] Continuation of Ser. No. 727,528, Apr. 25, 1985, abandoned.

[51] Int. Cl.$^4$ .............................. B60P 1/64; B60P 1/00
[52] U.S. Cl. .................................... 414/543; 296/181; 296/37.6; 414/560; 414/348; 414/544; 414/642; 414/633; 414/629; 414/631
[58] Field of Search ............... 414/347, 348, 539, 540, 414/541, 631, 542, 543, 544, 637, 632, 633, 650, 660, 659, 640, 641, 642, 663, 664, 665, 631, 667, 628, 629, 668, 669, 670, 671, 718, 560; 296/181, 182, 183, 37.6

[56] References Cited

U.S. PATENT DOCUMENTS

| | | | |
|---|---|---|---|
| 2,501,112 | 3/1950 | Webster | 414/547 |
| 2,772,794 | 12/1956 | Cramer et al. | 414/543 |
| 3,176,861 | 9/1961 | Paul et al. | |
| 3,272,365 | 9/1966 | Stevens | 414/633 |
| 3,301,416 | 1/1967 | Bopp | |
| 3,368,704 | 2/1968 | Pope | 414/545 |
| 3,376,988 | 4/1968 | Klosk | 414/498 |
| 3,477,595 | 3/1969 | Whitfield | |
| 3,501,195 | 3/1970 | Kramer, III | 414/542 X |
| 3,539,060 | 11/1970 | Rastelli | 414/540 |
| 3,811,579 | 5/1974 | Black | 414/347 |
| 4,183,708 | 1/1980 | Kuhbier et al. | 414/543 |
| 4,187,048 | 2/1980 | Bohlmann | 414/348 X |
| 4,289,442 | 9/1981 | Stevens | 414/631 X |

FOREIGN PATENT DOCUMENTS

| | | | |
|---|---|---|---|
| 210515 | 3/1956 | Australia | 414/542 |
| 2732256 | 1/1979 | Fed. Rep. of Germany | 414/542 |
| 2393708 | 2/1979 | France | 414/542 |
| 91701 | 7/1959 | Netherlands | 414/633 |
| 1318199 | 5/1973 | United Kingdom | |
| 1388616 | 3/1975 | United Kingdom | 414/666 |

*Primary Examiner*—Frank E. Werner
*Attorney, Agent, or Firm*—Richard G. Kinney

[57] ABSTRACT

A beverage truck having unique unloading and loading apparatus. The apparatus, which may be mounted to an existing beverage truck, or built into one as original equipment, has a framework at the front and back of the truck body which supports a track that spans the length of the body roof along its longitudinal center line. A trolley is carried on the track and moved by a powered chain drive from one end of the body to the other. Mounted to the trolley is a pivoting telescoping arm assembly that carries at the end of the arm a fork lift assembly. By operating simple controls, the user can move the trolley, extend the arm, raise, lower, rotate and tilt the forks to cause the forks to enter into the cargo area of the body, under the roof, to unload cargo from the truck and place it, e.g., on a loading dock or on the ground.

11 Claims, 16 Drawing Figures

TRUCK LOADING APPARATUS

This application is a continuation of application Ser. No. 727,528, filed Apr. 25, 1985, now abandoned.

BACKGROUND OF THE INVENTION

1. Field of the Invention

This invention relates generally to improved apparatus and system for loading and unloading containers onto and from the bed of a truck.

2. Description of the Prior Art

Containers such as soft drink cases on loaded pallets are often stacked on the bed of a truck for transportation to an unloading site where they are unloaded. In many situations, for example, cases of beverage are individually and manually unloaded, placed on a hand cart and wheeled into a store or tavern for retail distribution. This unloading procedure is laborious and time consuming. Other delivered material loaded on pallets may be too heavy for manual unloading and require unloading apparatus separate and distinct from the truck carrier. Such unloading apparatus, for example, a fork lift truck or an overhead crane, are expensive accessories for truck unloading operations which may be required only occasionally.

The prior art truck loading and unloading apparatus which are combined with the truck bed that I am aware of are positioned on the truck bed reducing to a considerable extent the carrying capacity of the truck bed. Such loading and unloading apparatus require such modification to the truck that the entire truck structure is modified making such an adaptation impractical to an existing truck. Such prior art cranes or loading and unloading apparatus may be practically designed only for newly manufactured trucks or truck beds.

Further, few if any exisiting truck unloading mechanisms are capable of use with beverage or like trucks which have roofs that cover the cargo area.

SUMMARY OF THE INVENTION

According to one feature of the present invention, the material handling apparatus constructed in accordance with my invention may be easily combined with an existing truck or truck bed without sacrificing truck bed space and without extensively redesigning the truck to accommodate disturbance of lifting forces for which the truck was not designed. The material handling apparatus of my invention may be added to prior art trucks without the necessity of extensive redesign of the truck bed. My apparatus though capable of handling heavy loads is uniquely structured to maintain the stability of the truck bed for which it was designed. My invention includes fork lift arms generally horizontally oriented which are supported on a vertical mast. The top end of the vertical mast is supported at the end of a telescoping arm extending horizontally from a trolley carriage which travels on a horizontally positioned rail or track longitudinally positioned over the bed of the truck. The rail is supported over the bed and centrally thereover on upright posts at the forward part and rearward part of the truck bed. Separate motor devices are provided on the longitudinal rail to move the trolley carriage longitudinally over the truck bed and to extend and retract the telescopic arm as well as to lift and lower and otherwise manipulate the fork lift.

In accordance with a broader feature of the present invention, a beverage truck having a roof over its body is provided with an unloading apparatus which comprises a lifting device mounted above the roof of the body with said device including means for reaching under the roof to remove cargo from the interior of the body.

Other advantages are obtained from the unique and novel structure of my invention and which will become apparent upon a reading of the following detailed description while referring to the accompanying drawings which illustrate a preferred embodiment of this invention.

In this specification and in the claims we will occasionally use the term "beverage truck" by which we mean a large truck whose covered body has side doors along its length to expose cargo covering areas and from which and to which cargo is loaded. Such trucks are commonly used for delivery of multi-case lots of canned and bottled soft drinks and beer. Although termed herein beverage truck it is understood that the term identifies such a truck no matter what may be the actual cargo.

DETAILED DESCRIPTION OF ONE EMBODIMENT OF THE INVENTION

Figure 1:
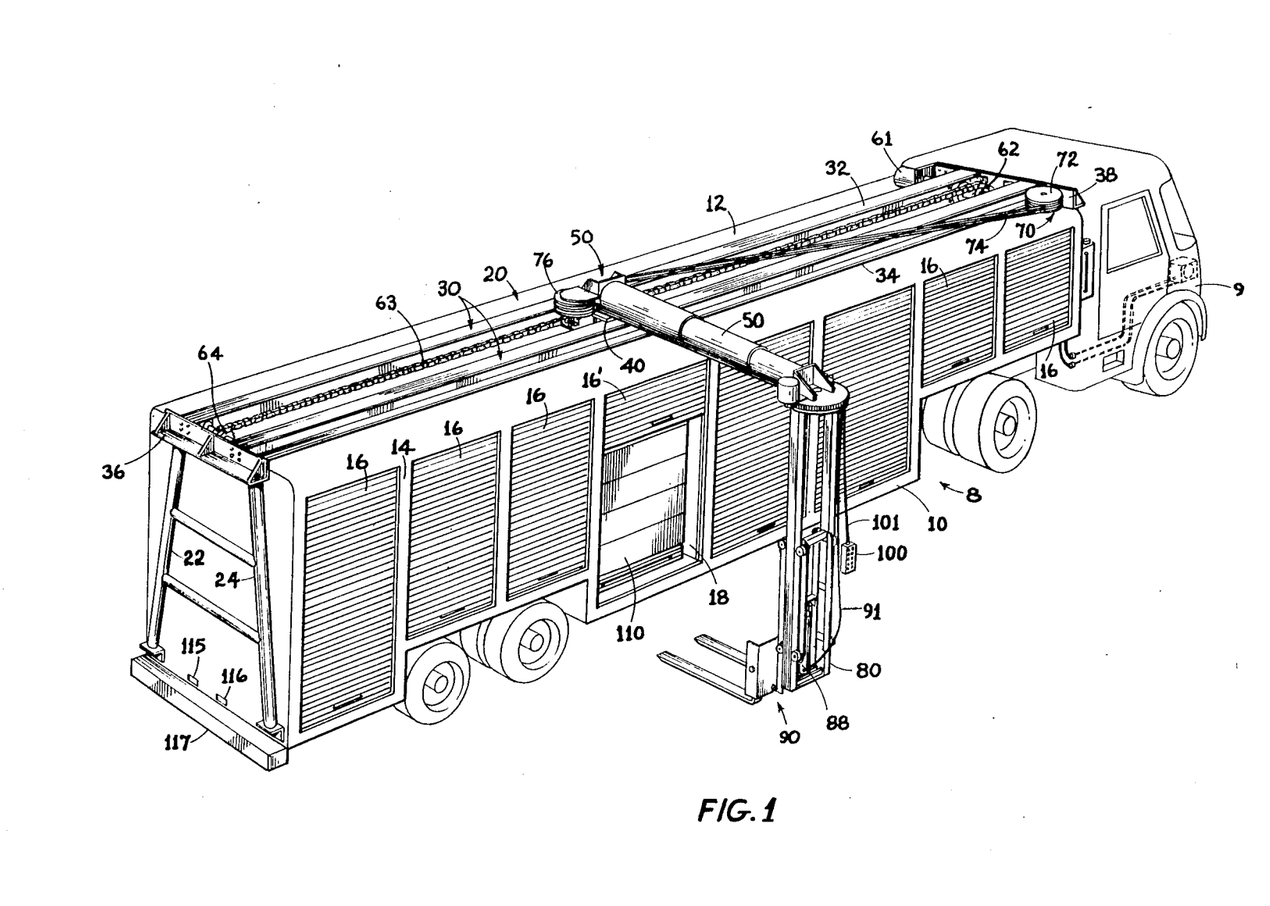
FIG. 1 is a perspective view of a beverage truck incorporating the present invention.

Referring to FIG. 1, there is depicted a beverage truck 8 having a conventional cab 9 and a body 10. The body 10 has a roof 12 that substantially covers a cargo area, and side walls 14 comprised of a number of overhead doors 16 that may be raised (as is the door 16') to allow access to a compartment 18 sized to receive a stacked load of cases 110 of, for example, canned beer or soft drinks. As thus described the truck 8 is, more or less, conventional.

In accordance with the present invention, however, the truck 8 is provided with a unique unloading and loading apparatus, generally designated by the number 20.

The apparatus 20 comprises a framework including rear supports 22, 24 and front supports 26, 28 (seen better in FIG. 2) that are secured to the body frame 10F at its front and rear sections. The framework made up of supports 22, 24, 26, 28 serves to support a track unit 30 that runs longitudinally along and above the roof 12 along the roof's longitudinal centerline.

The track 30 is made up of two parallel I-beams 32, 34 affixed as by bolting at either end to cross supports 36, 38 that respectively are similarly affixed atop the rear supports 22, 24 and front supports 26 and 28.

Mounted on the track 30 for movement along the track is a trolley unit 40. The trolley 40, as may be seen better from FIG. 3, preferably comprises a box-like framework having top and bottom plates 42, 44 that overlay and underlay the I-Beams 32, 34 and span between them. The plates 42, 44 are secured to trolley side walls 46, 48 which also mount, as by bolts and nut units 41, a set of wheels, four to each side, including large upper wheels 43 and slightly smaller lower wheels 45. These wheels 43, 45 ride on the interior flanges of the I-beams 32, 34.

Figure 2:
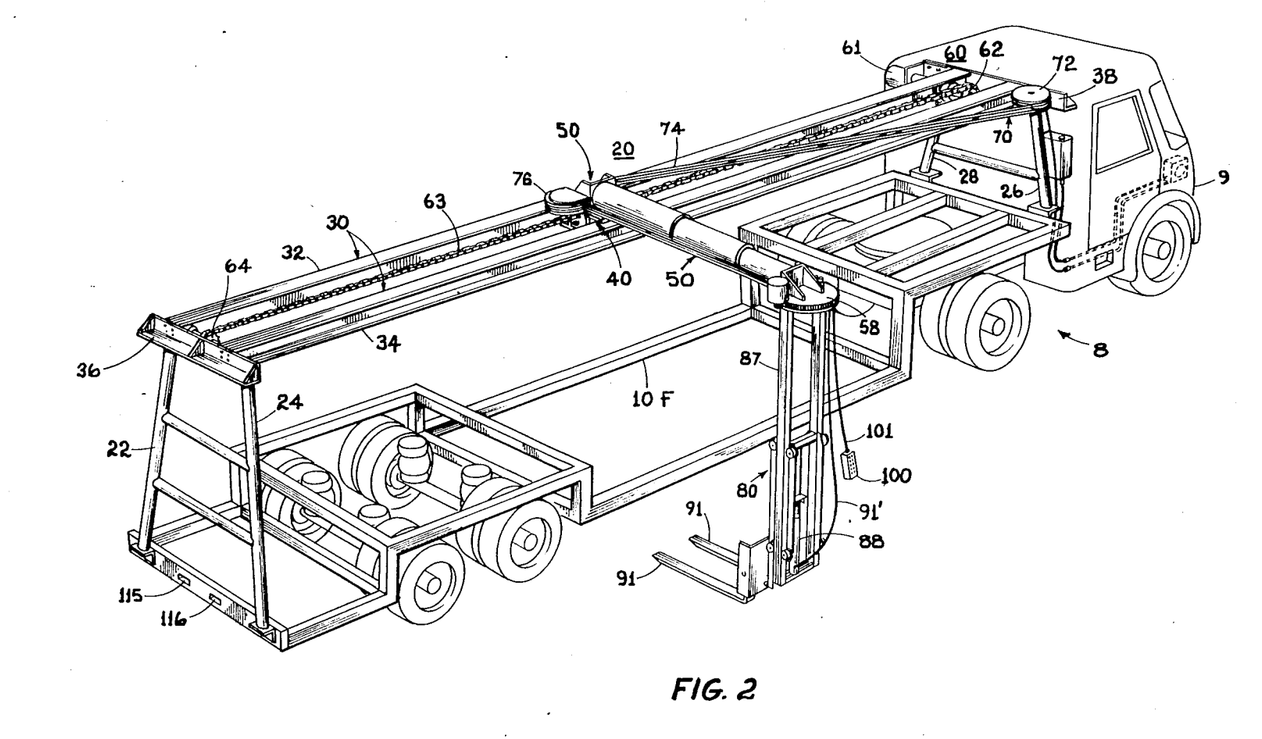
FIG. 2 is a skeletonal view of the same truck with the body and cargo removed to show its structural framework and the manner of affixing the improvements of the present invention thereto.
Figures 3, 4:
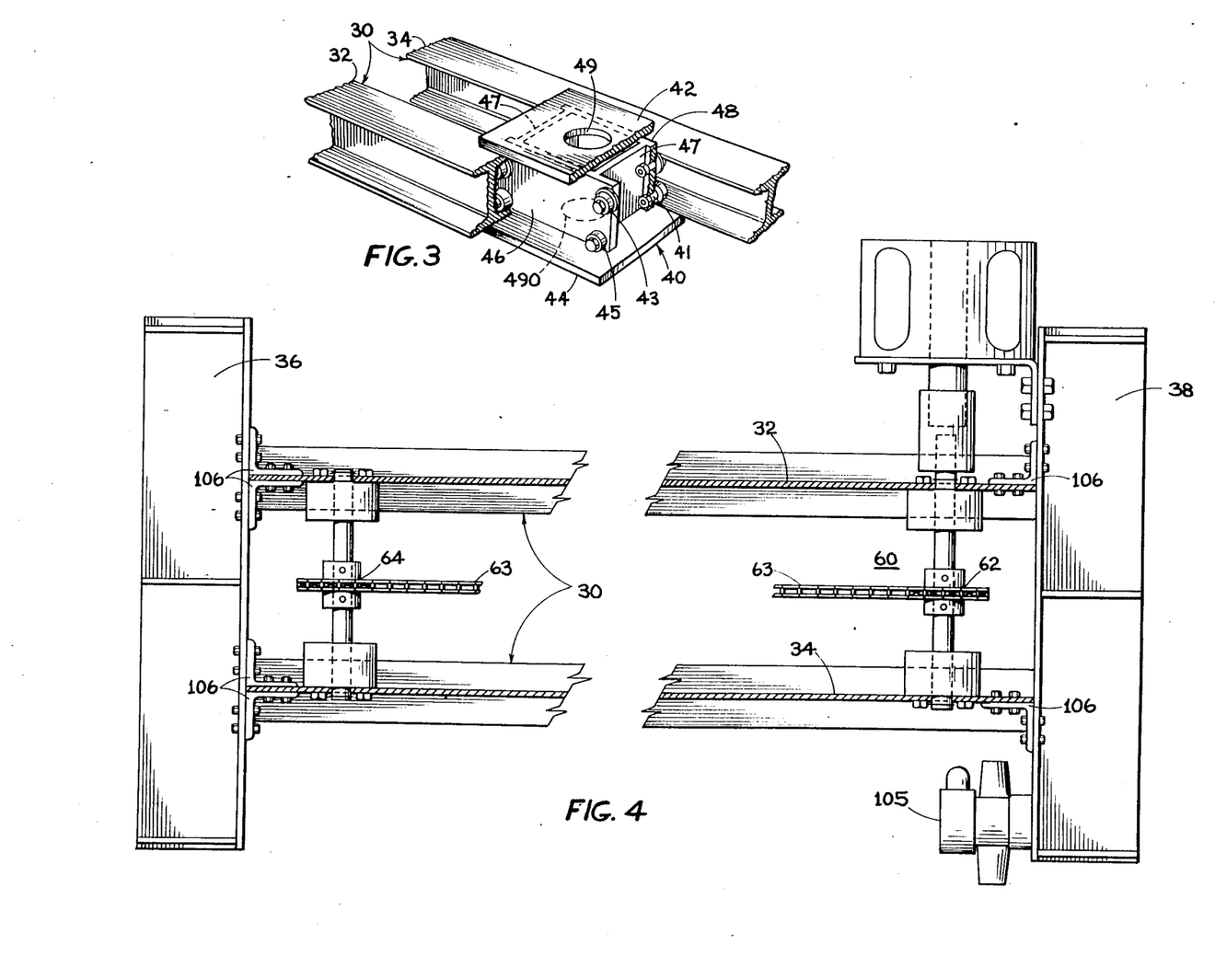
FIG. 3 is a detailed perspective view with parts broken away of a portion, namely the trolley, of the inventive structure.
FIG. 4 is a plan view, partly in section, with parts broken away, of a portion of the apparatus of FIGS. 1 and 2 showing a track for the trolley of FIG. 3.

The trolley 40 has, as is also shown in FIG. 3, additional support walls 47 spaced between the plates 40, 42 and the walls 46, 48 at right angles thereto to form a box like structure. The top and bottom plates 42 and 44 have a circular opening 49, 490 that receives and helps support a thrust bearing which depends from an arm unit 50 (FIGS. 1 and 2).

As also generally shown in FIGS. 1 and 2, and depicted in more detail in FIG. 4, the trolley 40 is moved along the track 30 by a powered and controlled chain drive system 60 that includes a motor 61 mounted to drive a sprocket 62 mounted between the I-beams 32, 34 at the front of the track 30. The sprocket 62 drives a chain 63 which runs to a second, freewheeling, sprocket 64 similarly mounted at the opposite end of the track 30. The chain passes under the trolley 40 and around the two sprockets and has its ends attached to opposite sides of the trolley (FIG. 2). Thus the trolley forms a link or part of the loop of the chain 63 such that operating the motor 61 in one direction drives the trolley 40 forward along the track 30 and by reversing the motor 61 moves the trolley rearward. And, by stopping the motor, the operator secures the trolley 40 in any desired longitudinal position between the sprockets 62, 64.

As is conventional with such a drive, limit switches are provided for stopping the motor when trolley 40 reaches its frontmost and rearmost positions. (As such are conventional they need not be and are not detailed here.)

As mentioned above, the arm unit 50 is pivotally mounted to the trolley 40 so that it may freely rotate in a horizontal plane. For ease of use and safety reasons this is preferred to be a simple unpowered pivot, which may be easily and manually moved as will be explained below.

Figure 5:
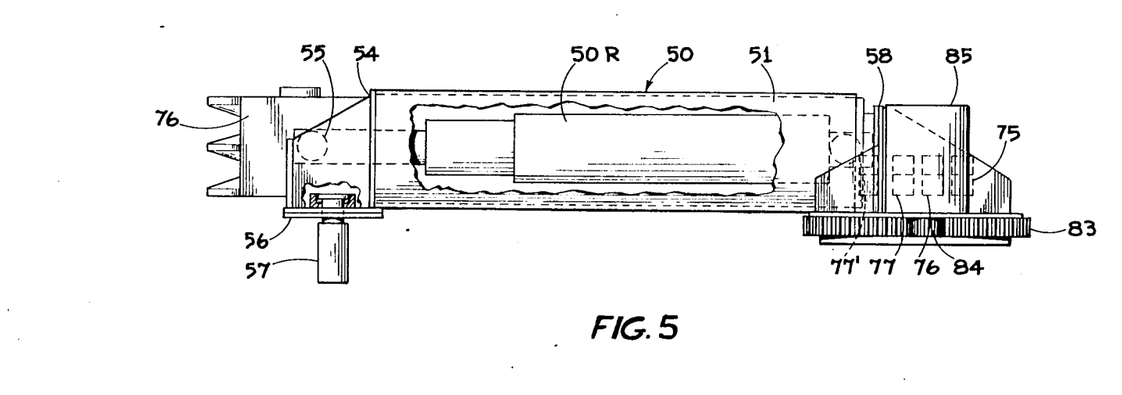
FIG. 5 is an elevational view of one part of the inventive apparatus of FIGS. 1–4, showing a telescoping arm that is mounted to the trolley of FIG. 3.
Figure 6:
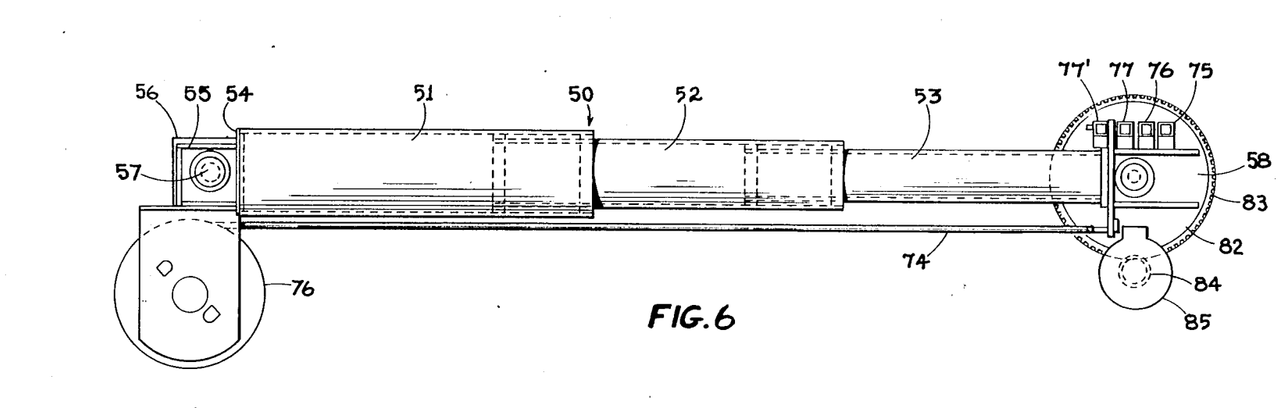
FIG. 6 is a plan view of the telescoping arm of FIG. 5 shown in its extended position.

The arm 50 is a telescoping arm, which as better shown in FIGS. 5 and 6, can extend from a retracted position to an extended position and is controlled to move to and be held at any intermediate extension. The arm 50 preferably is, as shown, made up of three intertelescoping cylinders 51, 52, 53 driven by a hydraulic ram 50R. The largest cylinder 51 has its base secured at 54 to a framework 55 that includes a bearing plate 56 and a thrust bearing 57. The thrust bearing 57 is received in the hole 49 (FIG. 3) of the trolley 40. Hydraulic fluid is supplied to ram 50R from a suitable source mounted on the truck through a hose and reel arrangement 70 best shown in FIGS. 1, 2, 15 and 16.

The hose and reel apparatus 70 includes a reel 72 mounted at the front of the track 30 from which a double hose set 74 runs to a second reel 76 mounted adjacent to the base of the cylinder 53. The hose set 74 is coupled to a set of solenoid valves 75, 76, 77 and 77' mounted at the front end 58 of the arm unit 50. One of these four-way valves serves to feed or drain hydraulic fluid to the ram 50R to extend or contract the arm 50. The other three valves' functions will be explained below.

Mounted at the end 58 of the arm unit 50 is a fork lift assembly 80. This assembly 80 includes a turntable arrangement 82 that has a driven gear wheel 83. Wheel 83 revolves in a horizontal plane and is driven by a drive gear 84. Drive gear 84 is in turn driven by a hydraulic motor 85. The motor 85 is controlled by one of the valves 75–77' to drive the gear 84 and rotate the gear wheel 83 and thus the entire fork lift assembly 80 in either direction. This can perhaps best be appreciated from FIG. 7, wherein the extended arm 50 allows the fork lift 80 to be rotated in a circle 89. Note that the fork lift assembly is free of the side wall 14 of the body 10 of the truck when it is so rotated.

The fork lift assembly 80, as best seen in FIGS. 1 and 2, comprises a vertical rectilinear frame 87 which serves to support the fork unit 90, and its load. The frame 87 also serves as a vertical track upon which the fork unit 90 may travel.

Figures 7, 8, 9:
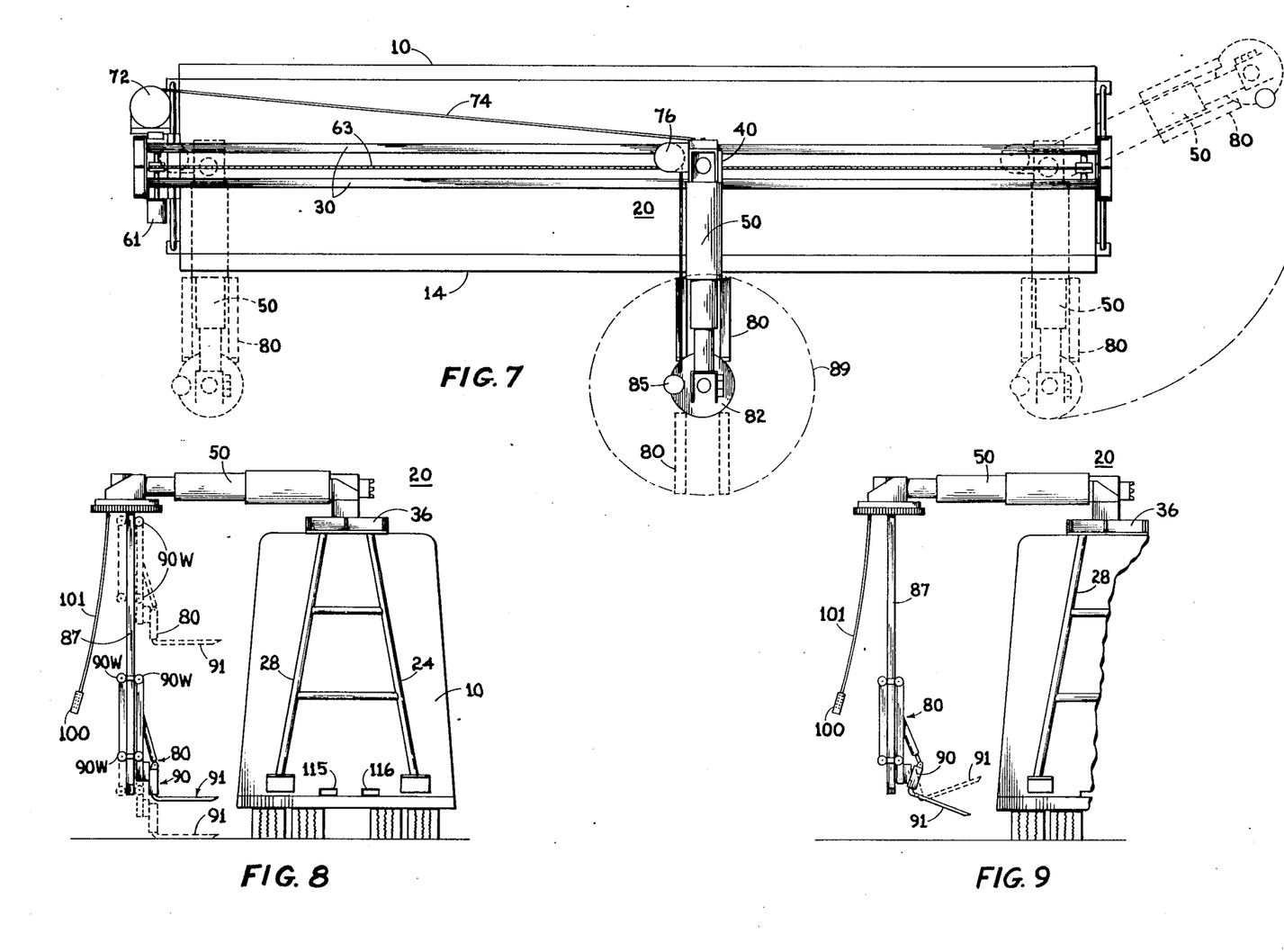
FIG. 7 is a top view of the truck body of FIG. 1 with parts shown in moved positions and illustrating different moved positions of parts in phantom outline.
FIG. 8 is an end elevational view of the truck of FIG. 1 showing moved positions of parts in phantom lines.
FIGS. 9 and 10 are each a fragmentary view similar to FIG. 8, with respectively a moved position and an interior part, shown in phahtom outline.
Figures 11, 12:
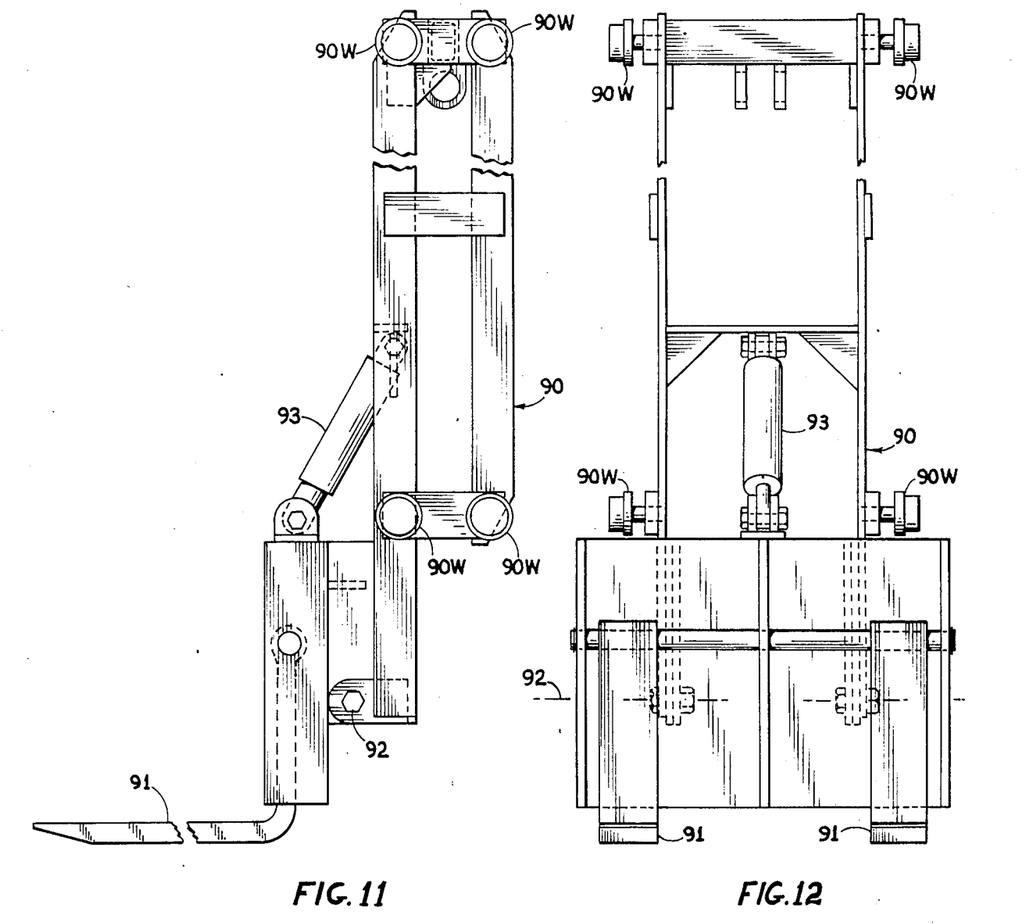
FIG. 11 is an elevational side view of the fork lift portion of the apparatus of FIGS. 1–10.
FIG. 12 is an elevational front view of the apparatus of FIG. 11.

The fork unit 90 is moved up and down by a triple cylinder ram arrangement 88. The ram cylinder 88 is controlled and powered via a double hose connection 91' from the valve 77. As shown in FIG. 8 this cylinder 88 may vertically move the fork unit 90 up and down the frame 87 from the ground (shown in phantom lines in FIG. 8) to a much higher position (also shown in phantom lines). The unit 90, includes wheels 90W (FIGS. 11 and 12) that travel on the frame 87 to decrease friction as the fork unit moves along it.

The fork unit 90 also has a unique controlled system for tilting the forks 91 at an angle to the horizontal as shown in FIG. 9. This is achieved by providing a pivot at line 92 (FIGS. 11 and 12) and a hydraulic cylinder 93 between the frame 87 and the fork carriage.

As shown in FIGS. 9, 10, 11, 14 and 15 the loading or unloading apparatus 20 is provided with a control unit 100 connected by a cable 101 to the solenoid valves 75, 76, 77, and 77' and also to the solenoid valve 105 (FIG. 4) that controls the chain driven motor 61.

Figures 14, 15, 16:
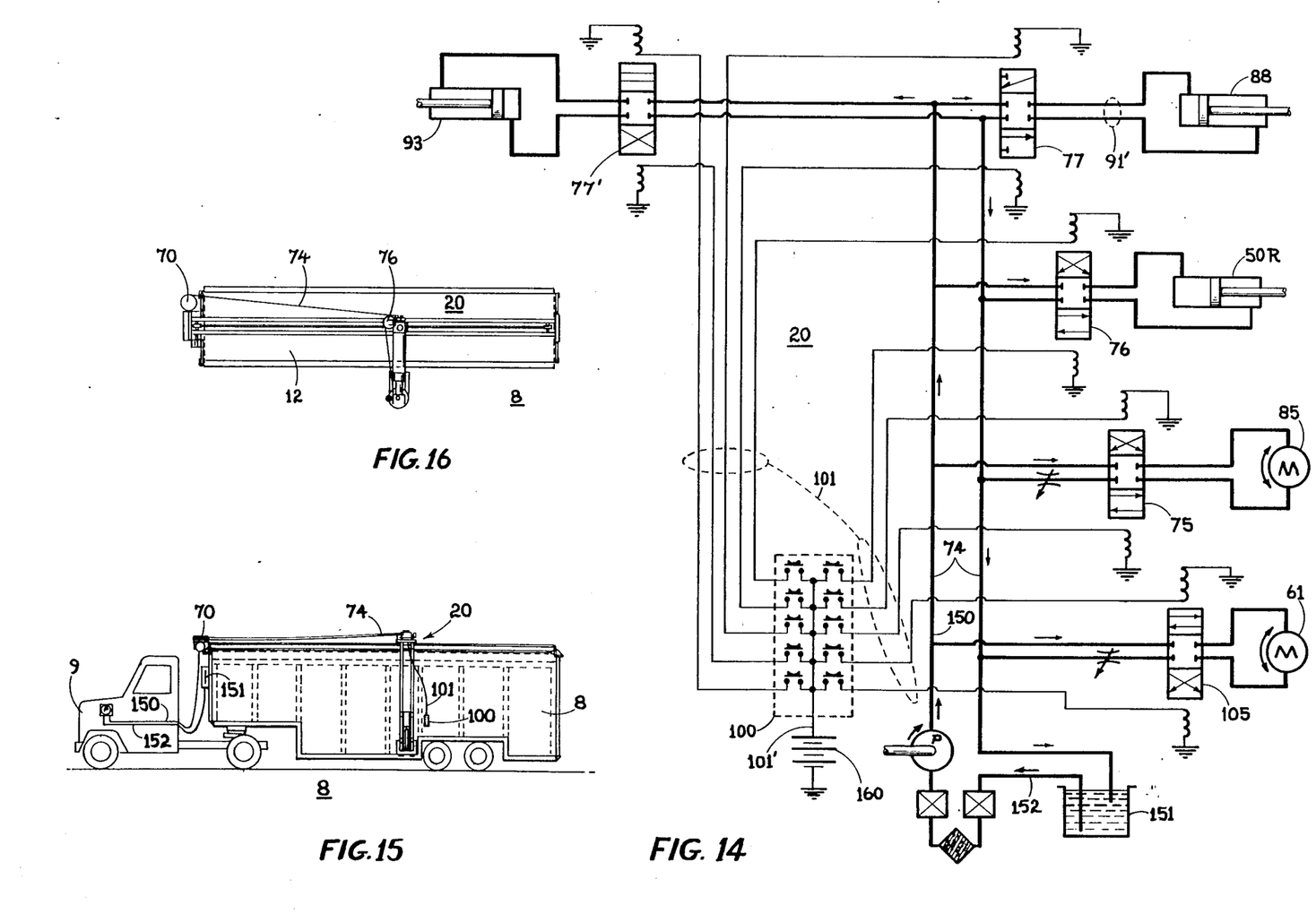
FIG. 14 is a schematic view of the control and power circuits of the truck of FIGS. 1–3.
FIG. 15 is a side view of the truck of FIGS. 1–14 showing, the control and power circuitry.
FIG. 16 is a top view of the truck body of FIG. 15 again showing the control and power circuitry.

The control and hydraulic circuitry are shown schematically in FIG. 14. The hydraulic circuit can be traced from a pump P which is coupled to be selectively driven by the engine of the cab 9 (FIG. 15). The output of the pump P is fed over a line 150 to the valve 105 and thus to the motor 61. It is also fed over the outgoing line of the hose set 74 to the valves 75, 76, 77, and 77' to the motor 85, and rams 50R, 88 and 93. The return lines from these units are fed via the other line of the set 74 to a reservoir 151. The pump P draws fluid from the reservoir 151 over a line 152 through suitable filters, air bleeders and check valves to complete the hydraulic circuit.

The electric control circuit can be traced from chassis ground through a battery 160, which may be the conventional 12 volt battery of the truck 8. Although for convenience in depiction the connection 101' from the battery 160 is not indicated as being part of the cable 101 it is preferably combined therein. The 12 volt potentially is fed in common to one side of each of 10 electrical switches of unit 100 which switches each, when closed, connects that potential to a solenoid coil that operates one of the valves 105, 75–77'. In each case the other sides of such coils are connected to chassis ground to complete the electrical circuit to ground.

Thus, by operating standard controls on the module 100, the operator (e.g. the truck driver) may move the fork 90 as shown in FIG. 9, raise the fork assembly up or down as shown in FIG. 8, rotate the fork assembly 80 as shown in FIG. 7, move the trolley 40, arm 50, and the fork assembly 80 along the length of the body 40 and, as illustrated in FIG. 7, manually swing the arm unit 50 from one side 14 of the body 10 across the rail of the truck body 10 to the other side of the truck body 10. And, of course, by operating a succession of these controls the operator can do all of these in combination.

Figure 10:
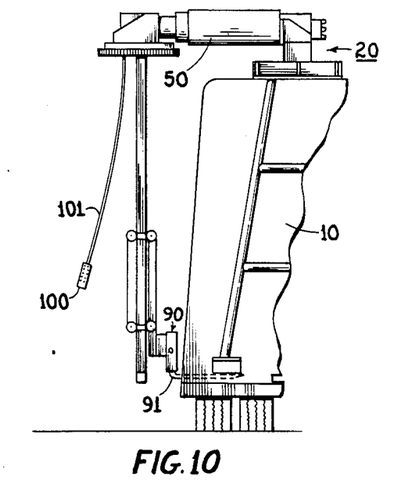

Most importantly, of course, the operator may, as illustrated in FIG. 10, move the forks 91 deep into the body 10 (FIG. 1) to remove from cargo compartments 18, the palletized cargo 110, and place it adjacent to the truck, e.g., on the ground or on a loading platform.

Similarly, the apparatus 20 may be used to load cargo that is on pallets back into the truck 8 as to pick up misdelivered or overstocked goods from a store. Although the apparatus 20 can be used to load the truck 8 at a warehouse or like facility, it is believed that it will be found more economical to use conventional fork lifts to load directly onto the truck.

Figure 13:
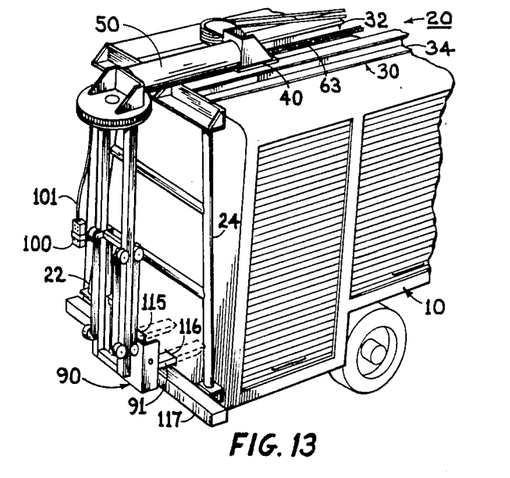
FIG. 13 is a partial perspective view of the truck similar to that of FIG. 1, showing parts in moved positions and with the fork lift in its storage position.

As shown in FIG. 1, the truck body 10 has a pair of holes 115, 116 above its rear bumper 117. These are openings into sleeves for receiving the forks 91. As shown in FIG. 13, when not in use and when the truck is driven the fork assembly 90 is conveniently stored at the rear of the truck with the fork 91 seated into these openings 115, 116.

The truck 8 and especially its body 10 preferably have an increased capacity air suspension to carry the added weight of the apparatus 20 and to counteract the tendency of the body to tilt when the apparatus 20 is in use. It may also be necessary or desirable to reinforce the frame 10F from that of conventional units.

For purposes of illustration and definitions of disclosure but not for purposes of limitation, the following mechanical components and dimensions will be identified and given. These are the presently contemplated components and values for making the apparatus 20. The inventor is still, at this time of this writing, in the process of perfecting the apparatus and may well, for various reasons, decide to vary and change these in the future. Also as these components have not yet been tested, it may be necessary to vary from these for practical purposes. Such is, of course, fully within the skill of the ordinary designer. Also, although believed to be correct, errors in copulation or transcribing may occur and the reader should use the well known engineering techniques to guard against these. With such cautions the following are submitted for definiteness of disclosure and not for limitation:

| Component | Example | Standard |
| --- | --- | --- |
| Cylinder Ram 50R | HYCO DOUBLE ACT. CYL. #42-58 | |
| Gear 84 | 5" PD GEAR × 785 PD × 1.80" × 2.25 ID | SAE 1045 |
| Reel 76 | GLEASON HOSE REEL #K18351-4 | |
| Cylinder 88 | HYCO SINGLE ACTING CYL. #43-75 | |
| Cylinder 51 | SCH 20 PIPE × 10" NOM DIA. | A-513 |
| Cylinder 51 | BRONZE PL 1¼" × ¾" × 29" with bridges | Oilite |
| Cylinder 52 | SCH 20 PIPE × 8" NOM. DIA. | A-513 |
| Cylinder 52 | BRONZE PL 1¼ × ¾" × 22" with bridges | Oilite |
| Cylinder 53 | SCH 40 PIPE × 6" NOM. DIA. | A-513 |
| Motor 61 | VICKERS HYDR. MOTOR | MHT 32 |
| Sprockets 62, 64 | 12 TEETH × 3.86 PD | ASAB 29 |
| Roller Chain 63 | PITCH × 12 | ASA #80 |
| Valves 105, 75, 76, 77, 77 | VICKERS 4-WAY VALVE | DG 4V-3 |
| Supports 36, 38 | 6" × 6" × ¾" ELL | A-36 |
| Framework 22, 24, 26, 28 and cross supports | 3" DIA. SCH 40 PIPE, | A-108 |
| I-Beams 32, 34 | STEEL 6 × 12.5 inch | A-36 |
| Cylinder 93 | ENERPAC 9 TON HYD. CYL. AND CLEV. | RD 93 |
| Forks 91 | 1¼ × 4 × 36" KEHNAR FORKS on a KEHNAR SHAFT TY. CARRIAGE | |

Several components of the described embodiment may well, for safety, be enclosed by shields to prevent entry of extraneous items into the moving parts. For example, the assembly 90 may well be so shielded to prevent the moving wheels 90W or framework from causing harm.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

I claim:

1. In combination with a truck of the type that as an elongated body enclosing cargo-carrying space which is covered by a permanent roof, and along whose oppositely directed sides are openings to allow loading or unloading of cargo into and out of the cargo space from the sides of the body and which body also has a transverse end, cargo-unloading apparatus comprising:

track means mounted longitudinally along said roof;
   a carriage mounted to said track means;
   an arm having an extendable portion mounted on said carriage and carried by that carriage so as to be moved along said roof, said arm and carriage being so constructed and mounted so as to allow the positioning of said extendable portion outward of any one of a range of positions along one of the other of said opposite directed sides and for the arm to revolve about a generally vertical axis so as to move said extendable end about one transverse end of the truck body;
   projecting means which may releasably engage cargo for lifting and carrying the cargo;
   powered and controlled depending means connected to said extendable portion of said arm and mounting said projecting engaging means;
   said powered and controlled means and said arm being controllable so as to move said projecting members deep into the cargo space under the roof at any number of different locations along the side of the body, through an opening therein, for lifting cargo therefrom and carrying it out and depositing it adjacent to the truck; and
   whereas said extendable portion and said depending means may be swung from one oppositely directed side of said body to the other oppositely directed side about a transverse end of said body, without the need to remove or raise said depending means, so it may serve to unload or load from either side.

2. The apparatus of claim 1, wherein
   said projecting means is a fork lift which includes a pair of forks, and means for controlled altering of the angle of inclination of said forks is provided so that they can be tilted up and down at various angles.

3. The apparatus of claim 1, wherein
   said arm includes means for controlled telescoping extension and contraction.

4. The improvement of claim 3, wherein
   said projecting means project laterally from said depending means so that said projecting means may enter the cargo area as the arm is telescopically decreased in length.

5. The apparatus of claim 3, wherein
   said apparatus includes means for controlled revolving of the projecting means so that it can point toward or away from the body.

6. The apparatus of claim 5, wherein
   said projecting means are forks and said apparatus includes means or controlled raising and lowering of said forks.

7. The apparatus of claim 6, wherein
   said forks which are at an angle to said depending means and said apparatus include means for controlled altering of the angle of said forks relative to said depending means.

8. The apparatus of claim 7, wherein
   said means for altering the angle of said forks; the means for controlling, raising and lowering of the forks; the means for revolving the lifting device; and the means for controlled movement of a portion of said apparatus along said track, are all controlled from a control module located near said lifting device.

9. The invention of claim 5, wherein
   said projecting means is forks,
   said apparatus includes means for controlled revolving the lifting device so that it can face toward or away from the body;
   said apparatus includes means for controlled raising and lowering of said forks to decrease or increase the displacement of the forks from said arm;
   said apparatus includes means for the controlled altering of the angle of said forks relative to the depending means.

10. The invention of claim 1, wherein
    said carriage is moved by a chain loop drive wherein the carriage forms a link in the chain loop.

11. Unloading apparatus for retrofitting to a beverage truck of the type that has an elongated body enclosing a cargo-carrying space which is covered by a permanent roof and along whose oppositely directed sides are openings to allow loading or unloading of cargo into and out of the cargo space from the sides of the body and which body also has transverse ends and a structural framework comprising:

framework and track means for being secured to the structural framework of the body at its transverse ends and including a longitudinal track for being mounted on or above the roof of the body;
    a carriage mounted to said track means for moving along said longitudinal track;
    an arm having an extendable position mounted on said carriage and carried by that carriage so as to be moved along said track, said arm and carriage being so constructed and mounted so as when mounted to the truck body they allow the positioning of said extendable portion outward of any one of a range of positions along one or the other of said opposite directed sides and to move said extendable end about and around one transverse end of the truck body from one oppositely directed side to the other oppositely directed side;
    projecting means which may releasably engage cargo for lifting and carrying the cargo;
    powered and controlled depending means connected to said extendable portion of said arm and mounting said projecting engaging means;
    said powered and controlled means and said arm being controllable so as to move said projecting members deep into the cargo space under the roof at any number of different locations along the side of the body, through an opening therein, for lifting cargo therefrom and carrying it out and depositing it adjacent to the truck; and
    whereas said extendable portion and said depending means may be swung from one oppositely directed side of said body to the other oppositely directed side about a transverse end of said body, without the need to remove or raise said depending means, so it may serve to unload from either side of the truck body.

* * * * *

UNITED STATES PATENT OFFICE
CERTIFICATE OF CORRECTION

Patent No. 4,690,609   Dated September 1, 1987

Inventor(s)   James M. Brown

It is certified that error appears in the above-identified patent and that said Letters Patent are hereby corrected as shown below:

Col. 4, Line 51, after "tilting", delete "the" and substitute --a pair of projecting members or--.

In the table at Col. 6 between Lines 28 - 53, the second occurrence of "77" should be --77'--.

Col. 7, Line 1, "as" should be --has--.

Signed and Sealed this

Twenty-third Day of February, 1988

*Attest:*

DONALD J. QUIGG

*Attesting Officer*   *Commissioner of Patents and Trademarks*